(12) United States Patent
Dao et al.

(10) Patent No.: US 11,881,992 B2
(45) Date of Patent: *Jan. 23, 2024

(54) INTELLIGENT PLUG-AND-PLAY POINT-TO-MULTIPOINT INTERNET OF THINGS (IOT) PLATFORM AND METHOD OF MANAGING AND USING THE SAME

(71) Applicants: Bang Tran Dao, Binh Dinh (VN); Hau Van Huynh, Tien Giang (VN); Canh Huu Nguyen, Ho Chi Minh (VN); Son Giang Lam, Ho Chi Minh (VN); Long Hong Le, Binh Dinh (VN)

(72) Inventors: Bang Tran Dao, Binh Dinh (VN); Hau Van Huynh, Tien Giang (VN); Canh Huu Nguyen, Ho Chi Minh (VN); Son Giang Lam, Ho Chi Minh (VN); Long Hong Le, Binh Dinh (VN)

(73) Assignee: EOH LIMITED LIABILITY COMPANY, Ho Chi Minh (VN)

( * ) Notice: Subject to any disclaimer, the term of this patent is extended or adjusted under 35 U.S.C. 154(b) by 134 days.

This patent is subject to a terminal disclaimer.

(21) Appl. No.: 17/068,952

(22) Filed: Oct. 13, 2020

(65) Prior Publication Data

US 2021/0119865 A1 Apr. 22, 2021

Related U.S. Application Data

(63) Continuation of application No. 16/504,336, filed on Jul. 8, 2019, now Pat. No. 10,805,155.

(51) Int. Cl.
*H04L 41/0806* (2022.01)
*H04L 45/16* (2022.01)
(Continued)

(52) U.S. Cl.
CPC .......... *H04L 41/0809* (2013.01); *G16Y 30/00* (2020.01); *H04L 12/2803* (2013.01);
(Continued)

(58) Field of Classification Search
CPC ............. H04L 12/1836; H04L 12/2861; H04L 29/06068; H04L 29/06224;
(Continued)

(56) References Cited

U.S. PATENT DOCUMENTS 10,262,019 B1 * 4/2019 Reiner .................. G06F 11/079
2008/0120408 A1 * 5/2008 Kim ....................... H04L 12/282
709/224

(Continued)

*Primary Examiner* — Brendan Y Higa (57) ABSTRACT

An Internet of Things (IoT) platform is disclosed which includes: a network; a plurality of IoT servers coupled together and serviced by the network; a plurality of IoT managers coupled to each other and to the plurality of IoT servers; and a plurality of IoT devices electrically coupled to the plurality of IoT managers, wherein the IoT servers and the IoT managers of the present invention are operable to configure a plug-and-play and point to multipoint communication environment where the plurality of IoT devices, the plurality of IoT servers, and the plurality of IoT managers communicate with one another in a plug-and-play manner and in a point to multipoint manner regardless of their physical connections, industrial standards, and communication protocols.

20 Claims, 6 Drawing Sheets

(51) Int. Cl.
*H04L 12/28* (2006.01)
*H04L 69/08* (2022.01)
*G16Y 30/00* (2020.01)
*H04W 4/70* (2018.01)
*H04L 41/16* (2022.01)
*H04L 41/0893* (2022.01)
*H04L 41/22* (2022.01)

(52) U.S. Cl.
CPC ...... *H04L 12/2807* (2013.01); *H04L 12/2814* (2013.01); *H04L 12/2832* (2013.01); *H04L 12/2861* (2013.01); *H04L 41/0893* (2013.01); *H04L 41/16* (2013.01); *H04L 41/22* (2013.01); *H04L 45/16* (2013.01); *H04L 69/08* (2013.01); *H04W 4/70* (2018.02)

(58) Field of Classification Search
CPC ... H04L 29/08558; H04L 41/12; H04L 41/22; H04L 45/16; H04L 69/08; H04L 2001/0093; H04L 12/2803–2838; H04L 41/0803–0809; H04L 67/12–125; H04L 41/04–044; H04L 41/0806–0809; G16Y 20/00–40; G16Y 30/00–10; H04W 84/18–22

See application file for complete search history.

(56) References Cited

U.S. PATENT DOCUMENTS

| | | | |
|---|---|---|---|
| 2008/0304408 A1* | 12/2008 | Kraemer | H04W 48/16 370/230 |
| 2012/0320923 A1* | 12/2012 | Vasseur | H04W 40/22 370/400 |
| 2015/0006450 A1* | 1/2015 | Ferre | G05B 15/02 706/14 |
| 2017/0048079 A1* | 2/2017 | Nethi | H04L 12/2836 |
| 2017/0105131 A1* | 4/2017 | Song | H04W 4/70 |
| 2017/0201585 A1* | 7/2017 | Doraiswamy | H04L 41/0806 |
| 2018/0020329 A1* | 1/2018 | Smith | H04W 4/90 |
| 2018/0041566 A1* | 2/2018 | Huang | H04L 67/06 |
| 2018/0063851 A1* | 3/2018 | Abraham | H04W 16/14 |
| 2018/0123820 A1* | 5/2018 | Kim | H04W 4/70 |
| 2018/0270310 A1* | 9/2018 | Venkatesan | H04L 67/12 |

* cited by examiner

INTELLIGENT PLUG-AND-PLAY POINT-TO-MULTIPOINT INTERNET OF THINGS (IOT) PLATFORM AND METHOD OF MANAGING AND USING THE SAME

CLAIM OF PRIORITY

This application is a continuation application under 35 U.S.C. § 120 of application Ser. No. 16/504,336, entitled "An Intelligent Plug-and-Play Point-to-Multipoint Internet of Things (lot) Platform and Method of Managing the Same", filed on Aug. 7, 2019. The parent application is incorporated herein in its entirety for reference.

FIELD OF THE INVENTION

The present invention relates generally to an Internet of Things (IoT) platform. More specifically, the present invention relates to an Internet of Things (IoT) platform capable of providing plug-and-play and point to multipoint communication between heterogeneous IoT devices regardless of their types, physical connections, industrial standards, operating parameters, and communication protocols.

BACKGROUND ART

The uses of Internet of Things (IoT) devices are increasing exponentially at a dizzy pace. By 2020, there will be 50 billion IoT devices. The Internet of Things (IoT) devices are the network of smart devices embedded with sensing, actuating, software, and network connectivity to sense and exchange data between the IoT devices and with the outside world. IoT applications include remote health monitoring, disease detection and monitoring, crop monitoring, accident prediction and detection, traffic monitoring, robotic rescue mission, environment pollution monitoring, unmanned aerial vehicle (UAV) rescue operation, which integrates and enables ambient sensing, ubiquitous communications, intelligent analytics, and pervasive computing. However, these developments of the IoT devices are complicated and slowed down by the lacks of standardization and interoperabilities. At the present time, new IoT devices cannot be readily connected to the existing IoT platforms in a plug-and-play manner because many IoT devices have been deployed with proprietary protocols. IoT devices manufactured in different countries and regions around the world are based on different industrial standards such as IEEE, Internet Engineering Task Force (IETF), ITU-T, OneM2M, 3GPP, Telecommunication Standards Development Society, India (TSDSI), Global ICT Standardization Forum for India (GISFI), Bureau of Indian Standards (BIS), Korean Agency for Technology and Standards (KATS), CISCO, IBM, Gartner, IDC, Bosch, and European Telecommunications Standards Institute. This fragmentation of standards makes the communication between different IoT devices difficult, if not impossible. At the present time, to deploy new IoT devices, the developers have to build the entire platform from ground up including network protocols, infrastructure, hardware, software, services, and device drivers. This will limit the full connectivity and usability for users of IoT devices.

Beside connectivity issues, new IoT devices connected to existing IoT platforms cannot communicate to the existing IoT devices due to the differences in their industrial standards, communication protocols, manufacturers, and physical connections. Consequently, the expansions of IoT devices result in segmented networks of IoT devices that cannot communicate to one another. This increases complexities, latencies, costs, and inefficiencies of the present IoT platforms. Furthermore, the lack of standardization prevents point to multipoint communication and seamless connectivities, thus hampering the intelligent analysis and intelligent actions for artificial intelligence and machine learning—an inherent characteristics of the Internet of Things (IoT).

There exist many attempts to solve the above problems. Standardization bodies have tried to standardize the Internet of Things (IoT). However, the standardization efforts are only within their own industries. For example, IEEE has their own standardization rules, IETF, One $M_2M$, OASIS have theirs, etc. This results in myriads of standardizations for the Internet of Things (IoT). Other inventors and private firms have also tried to solve the standardization and connectivity problems for the Internet of Things (IoT). In the U.S. patent application publication No. US-2015/0019714 by Shaashua et al. (hereinafter referred to as "Shaashua publication"), the inventors tried to solve the communication between different IoT platforms. The Shaashua publication provides an interoperable system that includes an integration interface 114 and the integration service system 112 that can cross-connect IoT devices from different vertical IoT platforms such as connected device A 102A in the cloud service A and connected device B 102B and connected device C 102C in the cloud serve B 106B. The Shaashua publication teaches, "For device-based integration, the integration application 328 may communicate with the IoT devices 324 belonging to different vertical solutions via an open protocol." (Shaashua, page 3, ¶[0043]). Thus, the Shaashua publication teaches a cross-communication between IoT devices connected to different cloud services and having different manufacturing standards as well as communication protocols.

However, the Shaashua publication fails to teach plug-and-play (PnP) of newly connected IoT devices and point-to-multipoint communications. The Shaashua publication focuses more on how to profiling a user than solving the plug-and-play and point to multipoint communication problems for existing IoT platforms. The Shaashua publication monitors the physical environment to obtain the semantics of an entity. Furthermore, in the Shaashua system, the integration application and the integration service system only serve as intermediator or gateway for the communication between IoT devices of two different cloud servers. That is, it would take many integration service systems and integration applications of the Shaashua publication to provide point to multipoint communication in a large IoT platform having many vertical integration systems. This would increase complexities and costs. Furthermore, Shaashua method does not guarantee point to multipoint communication for a large number of IoT devices in a large IoT platform. Shaashua also fails to teach the set up for such point to multipoint communication.

Therefore what is needed is an IoT platform that can provide plug-and-play and point to multipoint communication for any IoT devices regardless of their manufacturers, industrial standards, physical connections, and communication protocols.

In addition, what is needed is an IoT manager/server, when connected, that can provide plug-and-play and point-to-multipoint communication to any existing IoT platforms, hubs, gateways, and IoT devices regardless of their manufacturers, industrial standards, physical connections, and communication protocols.

Furthermore, what is needed is an IoT platform that can provide excellent plug-and-play and point to multipoint communication so that data analytics and artificial intelligence on user behaviors can be realized.

Yet what is needed is needed is an IoT platform that can provide excellent plug-and-play and point to multipoint communication that can increase seamless connectivity and usability for consumers.

The IoT platform and accompanying software program of the present invention provides technology that solve the above needs.

SUMMARY OF THE INVENTION

Accordingly, an object of the present invention is to provide an Internet of Things (IoT) platform which includes: a network; a plurality of IoT servers coupled together and serviced by the network; a plurality of IoT managers coupled to each other and to the plurality of IoT servers; and a plurality of IoT devices electrically coupled to the plurality of IoT managers, wherein the IoT servers and the IoT managers of the present invention are operable to configure a plug-and-play and point to multipoint communication environment where the plurality of IoT devices, the plurality of IoT servers, and the plurality of IoT managers communicate with one another in a plug-and-play manner and in a point to multipoint manner regardless of their physical connections, industrial standards, and communication protocols.

IoT devices, for example, can be smart phones, smart watches, smart sensors (mechanical, thermal, electrical, magnetic, etc.), networked appliances, networked peripheral devices, networked lighting system, communication devices Another object of the present invention is to provide a method of achieving a plug-and-play point to multiple point communication between a plurality of IoT devices, a plurality of IoT managers, and a plurality of IoT servers regardless of their physical connections, industrial standards, and communication protocols. The method comprises:

(a) detect a physical connection for each of the plurality of IoT devices, a plurality of IoT managers, and a plurality of IoT servers;

(b) detect a communication protocol for each of the plurality of IoT devices, a plurality of IoT managers, and a plurality of IoT servers;

(c) establish a plug-and-play communication with the plurality of IoT devices, a plurality of IoT managers, and a plurality of IoT servers based on said physical connection, said industrial standards, and said communication protocols;

(d) determine whether each of the plurality of IoT devices, the plurality of IoT managers, and the plurality of IoT servers is incorporated in a control webapp, if the plurality of IoT devices, the plurality of IoT managers, and the plurality of IoT servers are included the control webapp, then (e) use the control webapp to create a point to multipoint communication and plug-and-play environment for the plurality of IoT devices, the plurality of IoT managers, and said plurality of IoT servers;

(f) if any of the plurality of IoT devices, the plurality of IoT managers, and the plurality of IoT servers is not included in the control webapp, detect their operating parameters, their communication protocols, and their industrial standards;

(g) create configuration files for each of the plurality of IoT devices, the plurality of IoT managers, and the plurality of IoT servers based on said operating parameters, the communication protocols, and the industrial standards;

(h) embed the configuration files and load said operating parameters, the communication protocols, and the industrial standards into said control webapp, and (i) perform the step of using the control webapp to create the point to multipoint manner and in the plug-and-play manner.

Yet another aspect of the present invention is to provide an IoT manager/server for managing an IoT platform all connected together and serviced by a network; the IoT platform comprising pre-existing a plurality of IoT devices, pre-existing IoT managers, and pre-existing IoT servers. The IoT manager/server includes:

a configuration module configured to form and manage a control webapp;

a data handler module configured to manage and convert data and commands from the pre-existing IoT devices, a plurality of IoT managers, and a plurality of IoT servers;

an artificial intelligence and machine learning module configured to perform data analysis and predict operation behaviors of all IoT devices;

a device manager module to manage the plug-and-play and point to multipoint communications for all IoT devices by creating virtual nodes between said IoT manager and said plurality of IoT devices as soon as said plurality of IoT devices are first electrically coupled to and detected by said at least one IoT managers All the above aspects of the present invention achieve the following features and objectives:

An IoT platform that can achieve plug-and-play and point to multipoint communication for all IoT devices, IoT managers regardless of their industrial standards, physical connections, and communication protocols.

After connected to any pre-existing IoT platform, the IoT manager and IoT server of the present invention are capable of rendering such pre-existing IoT platform into a plug-and-play and point-to-multipoint communication IoT platform.

A plug-and-play and point-to-multipoint platform that can provide real-time data for all IoT devices connected thereto to increase the data analytics capability and artificial intelligence/machine learning to accurately predict the behaviors of users.

These and other advantages of the present invention will no doubt become obvious to those of ordinary skill in the art after having read the following detailed description of the exemplary embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the exemplary embodiments of the invention, examples of which are illustrated in the accompanying drawings. While the invention will be described in conjunction with the exemplary embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
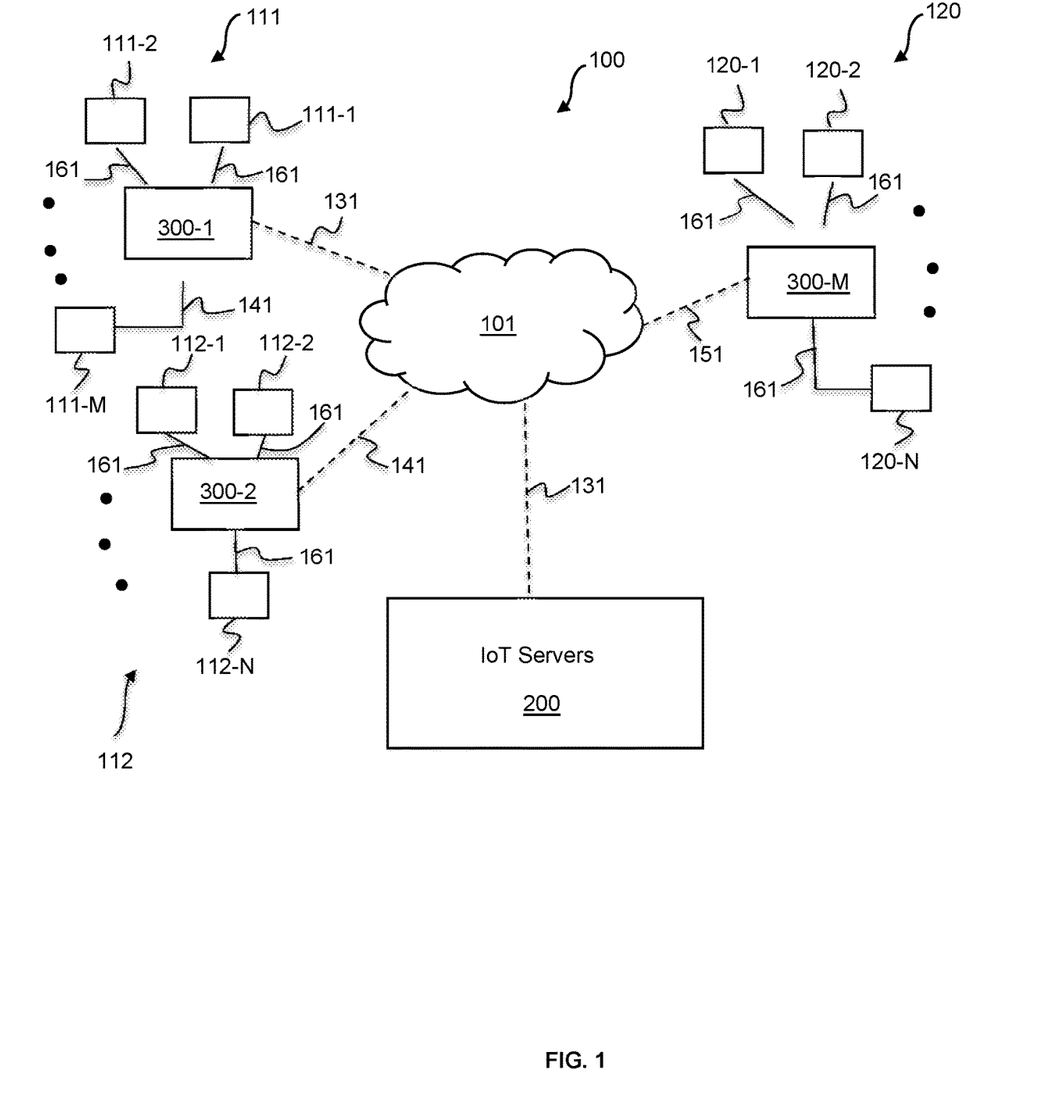
FIG. 1 is a schematic diagram of a plug-and-play point to multipoint IoT platform including a network, IoT servers, IoT managers, and different IoT devices in accordance with an exemplary embodiment of the present invention.

Various aspects of the present invention are now described with reference to FIG. 1-FIG. 6. FIG. 1 illustrates a schematic diagram of a plug-and-play point to multipoint IoT platform 100 including a network 101, IoT servers 200, IoT managers 300-1 to 300-N, first IoT integration group 111, second IoT integration group 112, and Mth IoT integration group 120 of IoT devices in accordance with an exemplary embodiment of the present invention. First integration group 111 includes IoT devices 111-1, 111-2 . . . , 111-N connected to IoT managers 300-1 via a local communication channel 161. Second integration group 112 includes IoT devices 112-1, 112-2 . . . , 112-N connected to IoT managers 300-2 via local communication channel 161. $M^{th}$ integration group 120 includes IoT devices 120-1, 120-2 . . . , 120-N connected to IoT managers 300-M via local communication channel 161. In some embodiments of the present invention, local communication channel 161 can be different for different IoT devices made by different manufacturers. In other embodiments, local communication channel 161 can be the same. Local communication channel 161 can be either wireless channels such as Bluetooth, 4G, LTE, 5G, Wi-Fi, Zigbee, Z-wave, radio frequency (RF), Near Field Communication (NFC), or wired such as RS-232, RS-485, USB, or any combinations thereof.

Continuing with FIG. 1, first integration group 111 and IoT servers 200 are devices of the present invention while second integration group 112 and $M^{th}$ integration group 120 are pre-existing IoT devices. It will be noted that pre-existing IoT devices are IoT devices that are connected to network 101 either before or after first integration group 111 and they are made by different manufacturers having different physical connections, communication protocols, industrial standards, as well as operating parameters from those in first integration group 111 of the present invention. First integration group 111 is connected to network 101 via a first external communication channel 131 in a first geographical location, e.g., U.S. Second integration group 112 is connected to network 101 via a second external communication channel 141 in a second geographical area, e.g., Mongolia. Third integration group 112 is connected to network 101 via a third external communication channel 151 in a third geographical location, e.g., Vietnam. First communication channel 131, second communication channel 141, and third communication channel 151 can be different physical connections such as wireless channels such as Bluetooth, 4G, LTE, 5G, Wi-Fi, Zigbee, Z-wave, radio frequency (RF), Near Field Communication (NFC), Ethernet, LoRaWAN, or wired such as RS-232, RS-485, USB, or any combinations thereof. First integration group 111, second integration group 112, and third integration group 120 can communicate to network 101 using different communication protocols such as Message Queue Telemetry Transport (MQTT), Data Distribution Service (DDS), HTTP, TCP/IP, (Advanced Message Queuing Protocol (AMQP), Modbus, BACnet, OPCUA, or any combinations thereof.

IoT devices 111-1, 111-2, . . . , 111-M in first integration group 111; IoT devices 112-1, 112-2, . . . , 112-N in second integration group 112; and IoT devices 120-1, 120-2, . . . , 120-N in third integration group 120 can be devices connected to control the operations and receive real-time data from refrigerators, smart watches, garage openers, air conditioners, thermostats, cameras, faucets, sprinkler systems, mobile phones, sensors, wearable devices, etc. IoT managers 300-1, 300-2, and 300-M can be gateways, IoT managers, IoT interfaces, etc. that are made by different managers with different physical connections, communication protocols, and operating parameters and functionalities. These IoT devices have different operating parameters such as open/close, ON/OFF, temperatures, times, pressure, images, blood pressures, heart beats, etc. Network 101 can be data center, cloud, or network such as nanonetwork, body area network (BAN), personal area network (PAN), local area network (LAN), campus/corporate area network (CAN), metropolitan area network (MAN), wide area network (WAN), and mesh area networks, or any combinations thereof.

As shown in FIG. 1, regardless of the physical connections, manufacturers, industrial standards, operating parameters, and communication protocols, and geographical locations, IoT manager 300-M and IoT servers 300 of the present invention are operable to provide plug-and-play and point-to-multipoint communication for all IoT devices from 111-1 to 120-N. The detailed hardware and software structures of IoT manager 300-M and IoT servers 300 of the present invention will be described in details in FIG. 2 to FIG. 6.

Figure 2:
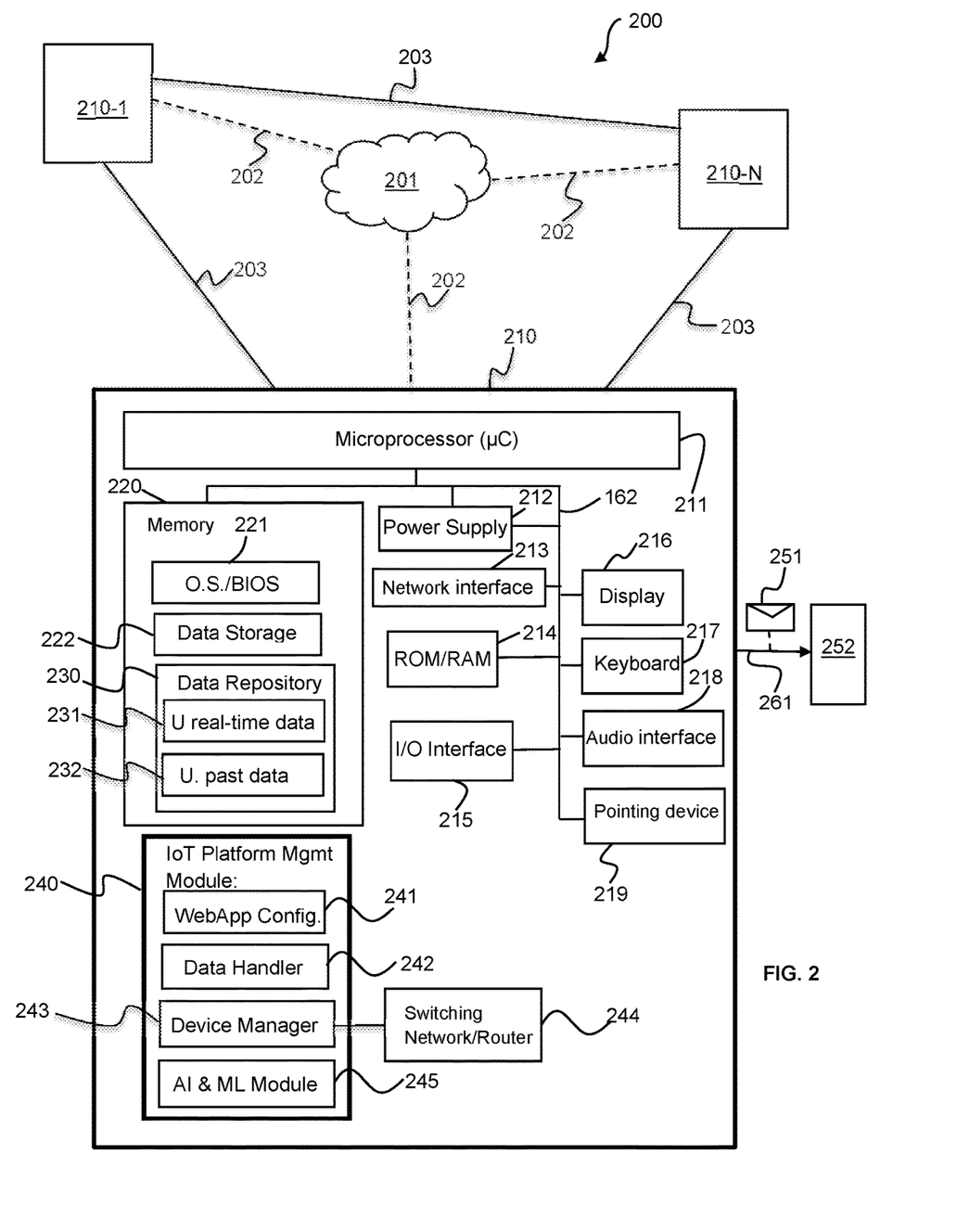
FIG. 2 is a schematic diagram of IoT servers including pre-existing IoT servers, a sub-network, and the inner structure of a plug-and-play IoT server of the press in accordance with an exemplary embodiment of the present invention.

Now referring to FIG. 2, a schematic diagram of IoT servers 200 in accordance with an exemplary embodiment of the present invention is illustrated. IoT server 200 includes a microprocessor 211 in communication with a memory 220 via a bus 162. IoT server 200 also includes a power supply 212, a network interface 213, a Read Only Memory (ROM), Random Access Memory (RAM) 214, an input/output interface 215, a display 216, a keyboard 217, audio interface 218, and a pointing device driver 219. Power supply 212 provides necessary power supplies to IoT server 200.

Memory 220 includes a basic Input/Output system (BIOS) 221, a data storage 222, a data repository 230 which includes a universal real-time data storage 231 and universal past data storage 232 storage for storing respective real-time, a past data for all IoT devices 111-1 to 120-N within IoT platform 100. More specifically, memory 220 stores Basic input/output system (BIOS) 221 for controlling low-level operation of IoT server 210. Memory 220 also stores an operating system (OS) 221 for controlling the operation of IoT server 210. Data storage 222 illustrates example of computer-readable storage media as well as computer-readable instructions, data structures, program modules or other data for storage of virtual nodes and infrastructure of the entire IoT platform 100. It will be appreciated that operating system (OS) and Basic input/output system (BIOS) 221 may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Continuing with FIG. 2, IoT server 210 may further include an IoT platform management module 240 which further includes a webapp configuration module 241, a data handler module 242, a device manager module 243 connected to a switching network/router 244, and an artificial and machine learning (AL/ML) module 245. Webapp configuration module 241 is a software application that receives data information of the infrastructure of IoT platform 100, the virtual nodes representing the connections between IoT devices 111-1 to 120-N and their respective IoT managers 300-1 to 300-M, their physical connections, communication protocols, industrial standards, and operating parameters to create a visual control webapp program that enables and controls the plug-and-playability and point-to-multipoint communication of the entire IoT platform 100. Data handler 242 receive data streams having different formats and data structure from different IoT devices 111-1 to 120-N and converts them into a format and structure that Webapp configuration module 240 and AI &ML module 245 can understand. Device manager module 243 receives instructions from the control webapp of the present invention to perform plug-and-play and point-to-multipoint communication for IoT managers 300-1 to 300-M and IoT devices 111-1 to 120-N. In some embodiments of the present invention, device manager module 243 is connected to switching network/router 244 to adaptively connect IoT devices 111-1 to 120-N in point-to-multipoint communication. AI & ML module 245 receives universal real-time data and past data and performs data analytics and predicts the behaviors of users. In many aspects of the present invention, AI & ML module 245 can instruct Webapp configuration module 241 to to intelligently set up the control webapp to connect IoT devices 111-1 to 120-N according to users' behaviors.

It will be noted that IoT servers 200 can be connected as a cluster different IoT servers 210-1 to 210-N connected and serviced by a sub-network 201. IoT server 210-1 and IoT server 210-N can be a pre-existing servers which are different from IoT server 210 of the present invention. More particularly, pre-existing IoT server 210-1 is connected to sub-network 201 via a communication channel 202. Pre-existing IoT server 210-N is connected to sub-network 201 via communication channel 202. IoT server 210 of the present invention is also connected to sub-network 201 via communication channel 202. All IoT servers 210-1, 210, and 210-N can be connected together in a master-slave configuration via another communication channel 203. As alluded above, sub-network 201 can be data center, cloud, or network such as nanonetwork, body area network (BAN), personal area network (PAN), local area network (LAN), campus/corporate area network (CAN), metropolitan area network (MAN), wide area network (WAN), and mesh area networks, or any combinations thereof. Communication channels 202 and 203 can be wireless channels such as Bluetooth, 4G, LTE, 5G, Wi-Fi, Zigbee, Z-wave, radio frequency (RF), Near Field Communication (NFC), Ethernet, LoRaWAN, or can be wired connectors such as RS-232, RS-485, USB, or any combinations thereof. IoT server of the present invention 210, pre-existing IoT servers 210-1 and 210-N can communicate to sub-network 201 using different communication protocols such as Message Queue Telemetry Transport (MQTT), Data Distribution Service (DDS), HTTP, TCP/IP, (Advanced Message Queuing Protocol (AMQP), Modbus, BACnet, OPCUA, or any combinations thereof. It is also noted that pre-existing IoT servers 210-1 and 210-N are IoT servers that are connected to sub-network 201 either before or after IoT server 210 of the present invention. They are made by different manufacturers having different physical connections, communication protocols, industrial standards, as well as operating parameters from those of IoT server 210 of the present invention.

Continuing with FIG. 2, IoT platform management module 240 may include computer executable instructions which, when executed by the control webapp to transmit, receive, and/or otherwise process messages (e.g., SMS, Multimedia Messaging Service (MMS) 251, Instant Message (IM), email, and/or other messages), audio, video, and enable telecommunication with users, at least one client mobile devices 252 via a communication channel 261. SMS message 251 can be a warning from any IoT devices 111-1 to 120-N that communicates to IoT server 210 in the point-to-multipoint communication according to the setup commands by the control webapp. In at least one of the various embodiments, IoT platform management module 240, webapp configuration module 241, data handler module 242, device manager module 243, and AI & ML module 196 may be implemented as hardware devices such as application specific integrated circuit (ASIC), combinatorial logic circuits, field programmable gate array (FPGA), software applications, and/or the combination thereof.

Figure 3:
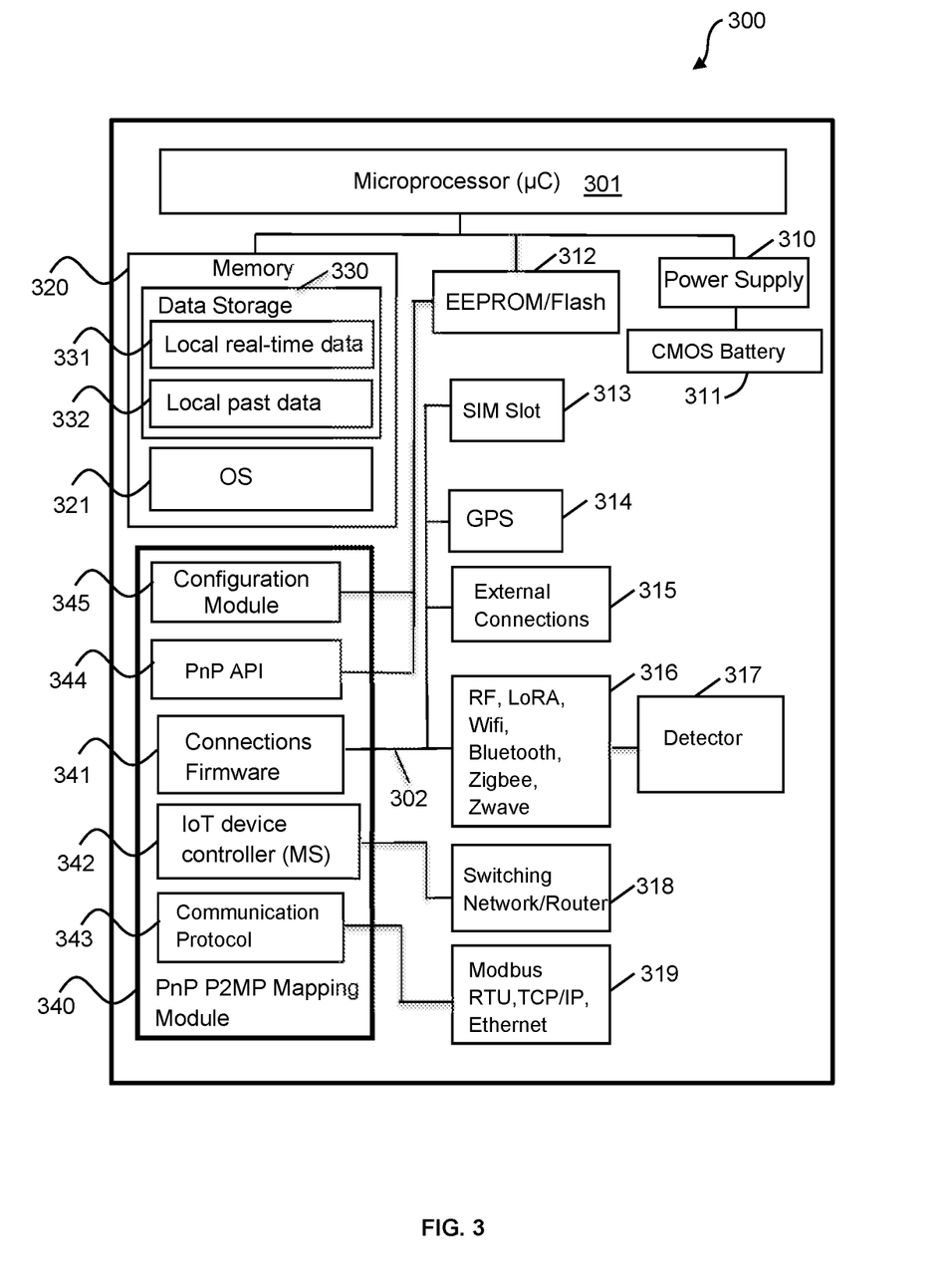
FIG. 3 is a schematic diagram of an IoT managers capable of point to multipoint communicating with IoT devices in a plug-and-play manner in accordance with an embodiment of the present invention.

Now referring to FIG. 3, a schematic diagram of an IoT manager 300 configured to map the virtual nodes and infrastructure of IoT platform 100 in accordance to an exemplary embodiment of the present invention is illustrated. If IoT manager 210 contains IoT platform management module 240 including webapp configuration module 241 to receive information and create the control webapp designed to control the plug-and-play and point to multipoint communication of IoT platform 100, IoT manager 300 includes modules and utilities sent out to actually retrieve information regarding physical connections, industrial standards, manufacturers, communication protocols, virtual nodes, and infrastructure of the entire IoT platform 100 including IoT servers 200, pre-existing IoT 301 in communication with a memory 320 via a bus 312. IoT server 300 also includes a power supply 310, a Complementary Metal Oxide Semiconductor (CMOS) supply 310, an Electrically Erasable Programming Memory (EEPROM)/Flash memory 312, a SIM slot 313, an Geo Positioning Satellite (GPS) 314, an external connection port 315, a multiple communication ports 316, a detector 317, a switching network/router 318, and a communication protocol port 319. Power supply 310 provides necessary power supplies to IoT manager 300. CMOS battery 311 is designed to provide voltage supply to IoT manager 300 when power supply 310 fails.

Continuing with FIG. 3, IoT manager 300 also includes a memory 320 and a plug and play point to multipoint mapping module (PnP P2MP) 340. Memory 320 includes an operating system (OS) 321, a data storage 330. OS 321 controls the operations of IoT local. Data storage 330 includes local real-time data storage 331 and local past data storage 332 for storing respective real-time, a past data for all IoT devices 111-1 to 120-N within IoT platform 100. Data storage 330 illustrates example of computer-readable storage media as well as computer-readable instructions, data structures, program modules or other data for storage of virtual nodes and infrastructure of the entire IoT manager 300. It will be appreciated that operating system (OS) 321 may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Continuing with FIG. 3, IoT manager 300 further includes an PnP P2MP module 340 which further includes a connection firmware 341, a IoT device controller 342, a communication protocol module 343, an PnP module 344, and a configuration module 345. More particularly, connection firmware 341 is a hardware and software device designed to detect the physical connections of other IoT managers and IoT devices 111-1 to 120-N. The physical connections such as wireless channels such as Bluetooth, 4G, LTE, 5G, Wi-Fi, Zigbee, Z-wave, radio frequency (RF), Near Field Communication (NFC), Ethernet, LoRaWAN, or wired such as RS-232, RS-485, USB, or any combinations thereof. In some embodiments of the present invention, detector 317 scans and detect the frequency of each IoT device 111-1 to 120-N, and then connection firmware 341 decides on the physical connections. In other embodiments, detector 317 is a scanner that scans the RFID, QR, barcodes, other codes that manufacturers printed on each IoT device 111-1 to 120-N. These codes will specify physical connections, communication protocols, types, and manufacturers of each IoT devices 111-1 to 120-N and IoT managers 300-1 to 300-M, and IoT servers 210-1 to 210-N. Similarly, in accordance with many embodiments of the present invention, communication protocol module 343 is a hardware and software tool designed to detect the communication protocols of each IoT devices 111-1 to 120-N and IoT managers 300-1 to 300-M, and IoT servers 210-1 to 210-N. As alluded above, different communication protocols includes, but not limited to, Message Queue Telemetry Transport (MQTT), Data Distribution Service (DDS), HTTP, TCP/IP, (Advanced Message Queuing Protocol (AMQP), Modbus, BACnet, OPCUA, or any combinations thereof.

Still referring to FIG. 3, after the physical connections and communication of IoT devices 111-1 to 120-N are determined, PnP module 344 and configuration module 345 are sent to each integration 111, 112, and 120 in order to map out the entire virtual nodes and infrastructure of IoT platform 100. Virtual nodes are connection nodes between each IoT manager and IoT devices 111-1 to 120-N. From the information about virtual nodes and other information such as physical connections, communication protocols, and manufacturers, configuration module 345 maps out the infrastructure of IoT platform 100 as described in FIG. 1. Virtual nodes and infrastructure will be sent to IoT server 210 so that webapp configuration module 241 can create the control webapp.

The control webapp controls IoT device controller 342 to control the operations of each IoT devices 111-1 to 120-N. Switching network/router 318 is operable to perform point to multipoint communication for IoT servers 200, IoT managers 300-1 to 300-M, and IoT devices 111-1 to 120-N. In some exemplary embodiments of the present invention, switching network/router 318, device controller module 342, and PnP module 344 can be either hardware or software engines or combinations thereof that are situated universally on network 101 or locally on each IoT managers 300-1 to 300-M. As mentioned before, in case where IoT devices 111-1 to 111-N can be located in different geographical locations from IoT devices 112-1 to 112-N and IoT devices 120-1 to 120-N, the physical detection of communication channels using hardware transceivers and antennas are not feasible. Thus, software devices such as device controller module 342, PnP module 344 of the present invention installed locally on each IoT managers 300-1 and 300-N or universally on network 101 are necessary to control the communication of IoT servers 200, IoT managers 300-1 to 300-M, and IoT devices 111-1 to 120-N.

Figure 4:
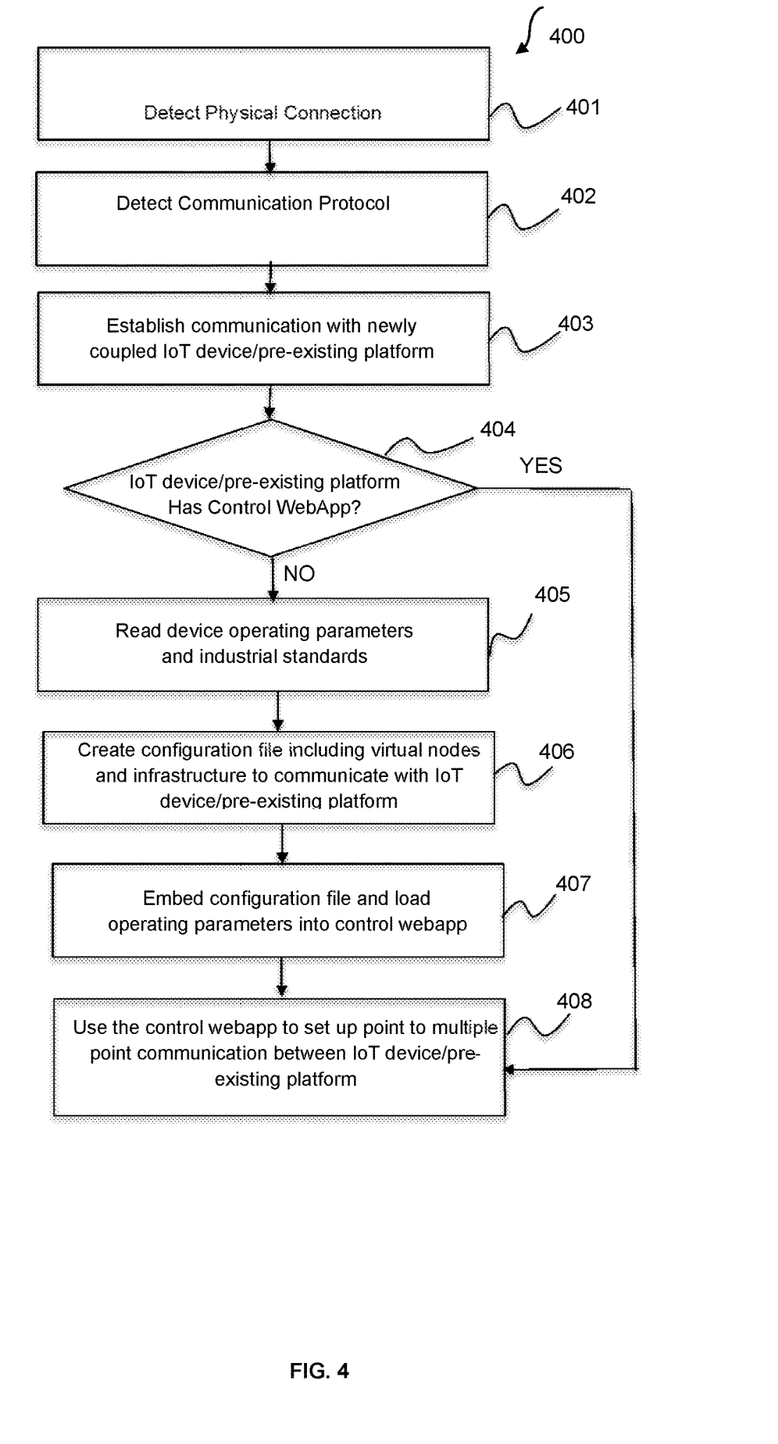
FIG. 4 is a flow chart illustrating a process of providing a plug-and-play point- to multipoint communication for various IoT devices in a IoT platform in accordance with an exemplary embodiment of the present invention.

Now referring to FIG. 4, a flowchart 400 illustrating a process of generating and managing a plug-and-play and point and multipoint communication for IoT devices 111-1 to 120-N in IoT platform 100 in accordance with an exemplary embodiment of the present invention is illustrated. In various aspects of the present invention, method 400 is implemented to enable any pre-existing IoT servers, any pre-existing IoT managers or hubs or gateways, and any pre-existing IoT devices to become plug-and-play and point to multipoint communication when connected to network 101 with IoT server 210 and IoT manager 300 of the present invention. In other words, within the scope of the present invention, when IoT managers 300 and IoT server 210 are connected to network 101 with pre-existing IoT managers 300-2 and 300-N and IoT servers 210-1 and 210-N, IoT manager 300 and IoT server 210 use PnP P2MP mapping module 340 to retrieve information regarding physical connections, communication protocols, manufacturers, operating parameters to create virtual nodes and infrastructure of the entire IoT platform 100. Then, IoT platform manager module 240 loads the information into a template software configuration to create the control webapp using configuration module 345. Finally, the control webapp will control and manage the plug-and-play and point to multipoint communication for IoT platform 100. The following steps of method 400 of the present invention disclose the features of the present invention.

At step 401, the physical connections and the existence of IoT devices, IoT managers, IoT servers are detected as soon as the IoT manager and IoT server of the present invention are connected therewith. In implementing step 401, physical connection module 316, detector 317, connection firmware 341, and PnP API 344 are used. In some embodiments, detector 317 is a scanner that scan barcodes, RFID, QR codes, and any other codes that contain physical connections of each IoT device 111-1 to 120-N. In many embodiments of the present invention, PnP API 344 and connection firmware 341 are sent into IoT platform 100 in order to detect the physical connections. Physical connections within the scope of the present invention include wireless short range communication channels include ZigBee™/IEEE 802.15.4, Bluetooth™, Z-wave, NFC, Wi-fi/802.11, cellular (e.g., GSM, GPRS, WCDMA, HSPA, and LTE, 5G, etc.), IEEE 802.15.4, IEEE 802.22, ISA100a, wireless USB, and Infrared (IR), LoRa devices, etc. Medium range wireless communication channels in this embodiment of communication link 161 include Wi-fi and Hotspot. Long range wireless communication channels include UHF/VHF radio frequencies. Wired connections include RS-232 and RS-485.

Next is step 402, the communication protocols of each device within the IoT platform is detected. In many aspects of the present invention, step 402 is implemented using communication protocol module 343. Within the scope of the present invention, communication protocols include Message Queue Telemetry Transport (MQTT), Data Distribution Service (DDS), Web/HTTP-HTML, TCP/IP-Internet, e-mail/IP-Internet, (Advanced Message Queuing Protocol (AMQP), Modbus, BACnet, OPCUA, Wireless Application Protocol (WAP), or any combinations thereof. Once communication protocols are detected, the sets of hardware/software rules that enables end-points communication between IoT servers 200, IoT managers 300-1 to 300-M, and IoT devices 111-1 to 120-N are known.

At step 403, once physical connections and communication protocols are known, communication within the IoT platform are established. In various implementations of step 403, IoT device controller 342 and configuration module 345 map out virtual nodes and the entire infrastructure of IoT platform 100. Data handler module 242 temporarily installed in EEPROM/Flash 312 of IoT manager 300 will receive and convert any commands in accordance to the communication protocols of each IoT device 111-1 to 120-N. Switching network/routers 244 and 318 implemented as hardware and/or software play important roles in the realization of step 403.

At step 404, whether each IoT device, IoT manager, and IoT server represented by a virtual node and infrastructure are incorporated into the control webapp is determined. Step 404 is implemented by IoT device controller 342 and device manager 243. In many aspects of the present invention, IoT device controller 342 and device manager 243 go into webapp configuration module 241 to check if newly found virtual nodes and infrastructure have been embedded in the control webapp in form of software buttons and device engines designed to control the plug-and-play and point to multipoint communication for each virtual node and each infrastructure.

At step 405, if the answer to step 404 is NO, operating parameters, industrial standards, physical connections, communication protocols of each IoT device, IoT manager, IoT server are read and embedded into each virtual node. Consequently, each virtual node representing an IoT device is provided with an ID. In many aspects of the present invention, step 405 is implemented by PnP API 344 including many device engines that enter each IoT device 111-1 to 120-N, each IoT manager 300-1 to 300-M, and IoT server 210-1, 210-2, and 210 to retrieve these information. In some other aspects of the present invention, detector 317 can be used to scan in the barcodes, QR codes, optical codes, RFID codes, and other codes that contain the above information.

Next, at step 406, the above information is incorporated into a configuration file. In some aspects of the present invention, configuration file is created and maintained by configuration module 345 in form of a software template. Information regarding physical connections, communication protocols, operating parameters, manufacturers, virtual nodes, and infrastructure are filled in entries of the software template.

At step 407, the configuration file laden with information is embedded into the control webpage. Webapp configuration module 241 uses the configuration file to create the control webapp. The control webapp is an active software program that contains many device engines, plug and play API that are controlled by device controller module 243 and IoT device manager 342.

At step 408, plug-and-play and point to multipoint communication of the IoT platform is controlled by the control webpage. In many aspects of the present invention, when a user registers to use the services provided by the control webapp, the user first logs in and sets the operations of IoT platform 100. Once the plug-and-play and point to multipoint communication is set, the control webapp sends out instructions to virtual nodes, device controller module 243 and IoT device manager 342 to perform the tasks set by the user. Referring back to step 408, when a newly connected IoT is connected to a pre-existing IoT platform and it is determined that this newly connected IoT device is already incorporated in the control webapp, step 408 is performed.

In summary the following objects of the present invention are achieved by process 400 of the present invention:

An IoT platform that can achieve plug-and-play and point to multipoint communication for all IoT devices, IoT managers regardless of their industrial standards, physical connections, and communication protocols.

After connected to any pre-existing IoT platform, the IoT manager and IoT server of the present invention are capable of rendering such pre-existing IoT platform into a plug-and-play and point-to-multipoint communication IoT platform.

A plug-and-play and point-to-multipoint platform that can provide real-time data for all IoT devices connected thereto to increase the data analytics capability and artificial intelligence/machine learning to accurately predict the behaviors of users.

Figure 5:
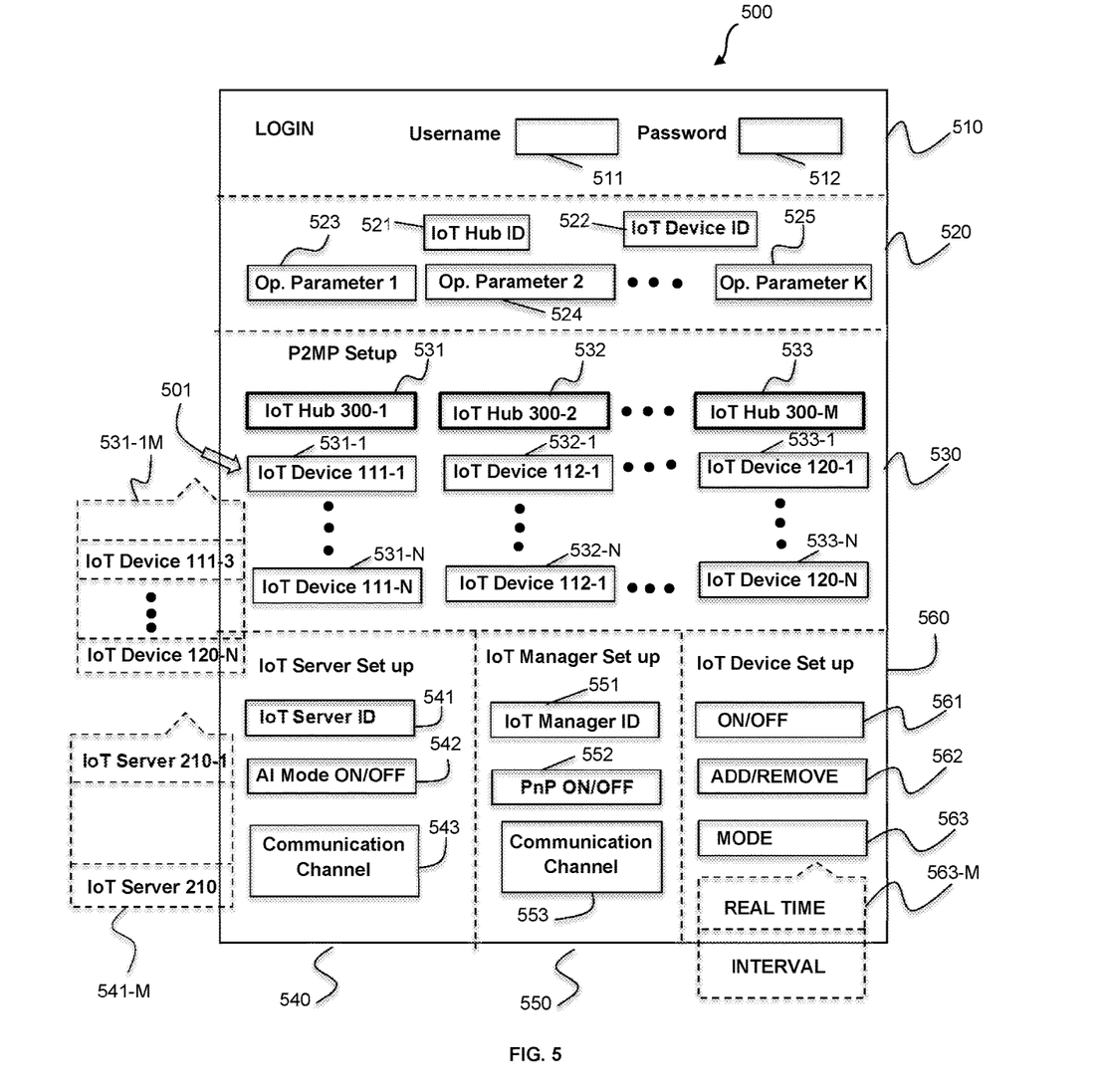
FIG. 5 is a flow chart illustrating a method of setting up a point to multipoint communication between IoT devices, IoT managers, and IoT servers within an IoT platform using a control webapp in accordance with an exemplary embodiment of the present invention.

Referring now to FIG. 5, a perspective view of a control webapp 500 configured to set up and manage the plug-and-play and point to multipoint communication between IoT managers 300-1 to 300-M, IoT servers 200, and IoT devices 111-1 to 120-N in accordance with an exemplary embodiment of the present invention is illustrated. In many embodiments of the present invention, control webapp 500 is created by webapp configuration module 241 which receives virtual nodes, infrastructure, physical connections, communication protocols, industrial standards, and operating parameters information from connection firmware 341, communication protocol module 343, and PnP API module 345.

In one particular embodiment of the present invention, control webapp 500 is displayed as a webapp on a computer screen of a user with a pointing device 501. In other embodiments of the present invention, control webapp 500 can be displayed on a touchscreen of a mobile phone and pointing device 501 is a finger of a user.

Continuing with FIG. 5, in an exemplary embodiments of the present invention, control webapp 500 includes a login section 510, a IoT device reading section 520, a point to multipoint setup section 530, an IoT server setup section 540, a IoT manager setup section 550, and an IoT device setup section 560. Login section 510 further includes a username window (or box) 511 and a password window (box) 512 for a user to perform a two step authentication process. Other methods of authentication such as scanning in barcodes, QR codes, RFID, or sending an authentication code to a registered email are also within the scope of the present invention.

IoT device reading section 520 includes an IoT manager box 521, IoT device 522. Below are all current operating parameter boxes such as operating parameter 1 523, operating parameter 2 524, and operating parameter K 525. A non-limiting example of IoT device reading section 520 is the display of the IoT device 522 as an air conditioner (AC) having first operating parameter 1 523 as real-time temperature (° C.), operating parameter 2 524 as time interval when the AC is turned on. For example, the user can set the AC to be turned on for 8 hours a day. Operating parameter K 525 is the speed of the AC. IoT manager box 521 is the hub or gateway where the AC is directly connected to. It is noted that the user can add or remove the operating parameters 523-525. For example, the user can add in the angle and/or the direction of the fan of the AC as other operating parameters. The connection between each IoT device 111-1 to 120-N and its IoT managers 300-1 to 300-M forms a virtual node which includes all the operating parameters 523 to 525. Behind IoT box 521 and IoT device ID box 522 are PnP API 344 configuration module 345 and their corresponding device engines that enter each IoT device 111-1 to 120-N to retrieve the necessary information such as operating parameters, communication protocols, physical connections, etc. so that webapp configuration module 241 can build control webapp 500 and IoT device reading section 520.

Continuing with FIG. 5, P2MP setup section 530 includes a matrix of IoT managers and IoT devices. Particularly, in the first column, IoT manager 300-1 box 531 includes all IoT device 111-1 box 531-1 to IoT device 111-N box 531-N that are connected directly to IoT manager 300-1. Similarly, in the second column, IoT manager 300-2 box 532 includes IoT device 112-1 box 532-1 to IoT device 112-N box 532-N. In the last column, IoT manager 300-M box 533 includes IoT device 120-1 box 533-1 to IoT device 112-N box 532-N. Referring again to FIG. 1, this map is achieved by virtues of PnP API 344 configuration module 345 and their corresponding device engines. In one exemplary embodiment of the present invention, when a user sets up the point to multipoint communication between these IoT devices 111-1 to 120-N, the user can move pointing device 501 to any of the above listed boxes, a dropdown menu 531-M will appear. The user only needs to click on any IoT devices, namely, 111-2 to 120-N in order to connect them to IoT device 111-1.

Still referring to FIG. 5, in IoT server setup section 540, an IoT server ID box 541 lists all IoT servers 120-1, 120-2, and 120 that are currently active. When the user moves pointing device 501 to IoT serve ID box 541, a dropdown menu 541-M informs the user all IoT servers that are active and detected by PnP API 344 configuration module 345 and their corresponding device engines. Next, an artificial intelligence/machine learning box 541 can be turned on or off. When box 541 is turned on, AI/ML module 245 will perform data analytics and automatically set up point to multipoint communication for the user. The results will be displayed in P2MP setup section 530. A communication channel box 543 displays the physical connections and communication protocols of the currently displayed IoT server in box 541. It will be noted that other information such as manufacturers, IoT server ID can also be displayed in box 540.

Continuing with FIG. 5, in IoT manager setup section 550, an IoT manager ID box 551 lists all IoT manager 300-1 to 300-M that are currently active. When the user moves pointing device 501 to IoT manager ID box 551, a dropdown menu (not shown) informs the user all IoT managers that are active and detected by PnP API 344 configuration module 345 and their corresponding device engines. Next, a plug-and-play box 551 can be turned on or off. When box 552 is turned on, PnP API 344 causes all IoT devices 111-1 to 120-N to be in plug-and-play mode. A communication channel box 553 displays the physical connections and communication protocols of the currently displayed IoT manager in box 551. It will be noted that other information such as manufacturers, IoT manager ID can also be displayed in box 550.

In IoT device setup section 560, a ON/OFF box 561 allows the user to turn on or off the modification for each IoT device 111-1 to 120-N. If box 561 is turned on, it allows the user to either add or remove operating parameters in an add/remove box 562. If the user changes operating parameters of an IoT device, IoT device reading section 520 will change accordingly. Finally, a mode box 563 sets either real-time mode or interval mode for each IoT device 111-1 to 120-N. When the user moves pointing device to mode box 563, a dropdown menu 563-M listing all the modes of each IoT device will appear to allow the user to select the mode of data transmission. As a non-limiting example, when the user wants IoT device 120-1 to transmit data in the real-time mode, the user shall do to the IoT device reading section 520 to change IoT device ID box 522 to display IoT device 120-1 and IoT manager ID box 521 to IoT manger 300-M. Then the user moves pointing device 501 to mode box 563 to select the real-time mode. As a result, IoT device 120-1 starts to send data to be displayed in IoT device reading section 520 in real-time manner.

Figure 6:
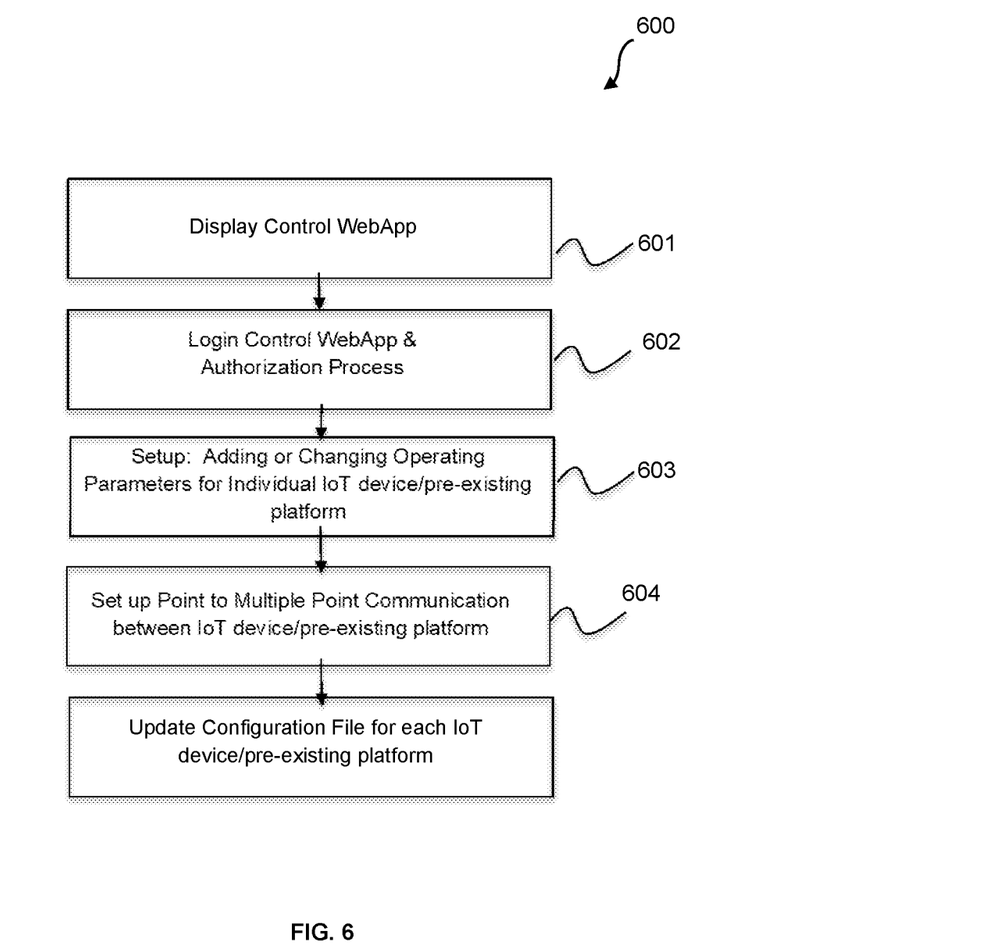
FIG. 6 is a perspective view of a webapp configured to provide plug-and-play and point to multipoint communication for an IoT platform in accordance with an exemplary embodiment of the present invention.

Finally, referring to FIG. 6, a flow chart illustrating a method 600 of setting up and managing a point to multipoint communication between IoT devices, IoT managers, and IoT servers within an IoT platform using a control webapp in accordance with an exemplary embodiment of the present invention is illustrated.

At step 601, a control webapp is activated and displayed. In accordance with many embodiments of the present invention, the control webapp is an interactive tool that directly controls the plug-and-play and point to multipoint communication between IoT devices 111-1 to 120-M in a manner described above in FIG. 2 to FIG. 3. Step 601 is implemented by control webapp 500. The detailed description of control webapp 500 is described above in FIG. 5.

At step 602, a subscribed user signs in and carries out the authorization process. Step 602 is implemented by log-in section 510.

At step 603, operating parameters for each IoT device are modified. Step 603 is implemented by IoT device reading section 520 and IoT device setup section 560.

At step 604, a point to multipoint communication manage IoT device is set up. Step 604 is implemented by P2MP setup section 530. In another embodiment, step 604 can be implemented by turning on AI/ML box 542.

At step 605, configuration file is updated. The configuration file is updated based on the changes that user selects in step 602 to 604. Step 605 is implemented by webapp configuration module 241, AI&ML module 245, configuration module 345, IoT device controller module 342, and PnP API 344.

From the disclosures above as illustrated in FIG. 1-FIG. 6, the present invention achieves the following objectives:

An IoT platform that can achieve plug-and-play and point to multipoint communication for all IoT devices, IoT managers regardless of their industrial standards, physical connections, and communication protocols.

After connected to any pre-existing IoT platform, the IoT manager and IoT server of the present invention are capable of rendering such pre-existing IoT platform into a plug-and-play and point-to-multipoint communication IoT platform.

A plug-and-play and point-to-multipoint platform that can provide real-time data for all IoT devices connected thereto to increase the data analytics capability and artificial intelligence/machine learning to accurately predict the behaviors of users.

Computer program code for carrying out operations for aspects of the present invention such as PnP P2MP mapping module 340 or IoT platform management module 240 may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS

100 IoT plug-and-play point to multipoint network
101 a network such as internet, LAN, WAN, cloud
111 First integration group
111-1 IoT device such as a thermostat, a garage opener
111-2 Another IoT device of the first IoT manager
111-N an $N^{th}$ IoT device of the first IoT manager
112 Second integration group
112-1 IoT device connected to a second IoT manager
112-2 A second IoT device of the second IoT manager
112-N an Nth IoT device of the second IoT manager
120 Third integration group 120-1 A first IoT device that is connected to the Mth hub
120-2 A second IoT device connected to the Mth IoT manager
120-N The Nth IoT device connected to the Mth IoT manager
131 a connection between IoT server and the cloud
141 a connection between IoT devices and IoT manager
200 IoT servers
201 Network for IoT servers
202 Communication channels IoT managers and the network
203 Connections between assortments of IoT managers
210 IoT server of the present invention
210-1 Existing IoT server including industrial IoT managers
210-K Kth existing IoT server including industrial IoT managers
211 Microprocessor for IoT server
212 Power supplies for the IoT server
213 Network interface for the IoT server
214 ROM/RAM for the IoT server
215 I/O Interface
216 Display device for the IoT server
217 Keyboard device for the IoT server
218 Audio interface for the IoT server
219 Pointing device for the IoT server
220 Memory device for the IoT server
221 O.S./BiOS for the IoT server
222 Data storage
230 Data repository for the IoT server
231 Universal real-time data for the IoT server
232 Universal past data
240 IoT platform management module
241 Webapp configuration module
242 Data handler module
243 Device Manager module
244 Switching Network
245 Artificial Intelligent and Machine Learning Module
251 SMS message from IoT server to the client device
252 Client devices including laptops, computers, mobile devices
261 Connections between client devices to IoT server
300 Architecture of the IoT manager of the present invention
300-1 First IoT manager of the present invention
300-2 Second IoT manager of the present invention
300-M Mth IoT manager of the present invention
301 Microprocessor of the IoT manager
302 Electrical connections
310 Power supply
311 CMOS backup battery
312 EEPROM/Flash memories
313 SIM slot
314 GPS
315 External connections manager
316 Physical connections Module
317 Detector
318 Switching Network
319 Communication protocols Module
318 Switching network
320 Memory
321 Operating System (OS)
322 Local past data
330 Data storage
331 Local real-time data
332 Local past data
340 Plug-and-Play Point to Multipoint Mapping Module
341 Connection firmware
342 IoT device controller
343 Communication protocol
344 PnP API
345 Configuration module
500 WebApp
501 Pointing device, e.g., cursor
510 Authorization section
511 Username
512 Password
520 IoT device Reading Section
521 IoT manager Selector
522 IoT device Selector
530 Point to Multipoint connection setup section
531 First IoT manager selector
51-1 IoT device 111-1
531-N IoT device 111-N
531-M Drop down menu
532 Second IoT manager selector
532-1 IoT device 112-1
532-2 IoT device 112-2
532-N IoT device Nth
533 Mth IoT manager selector
533-1 IoT device 120-1
533-2 IoT device 120-2
533-N IoT device 120-N
540 IoT server set up
541 IoT server ID
541-M Dropdown list of all active IoT servers
542 AI mode ON/OFF
543 Communication channel of current IoT server
550 IoT manager set up
551 IoT manager ID
552 Plug-and-play mode ON/OFF
553 Communication channel of current IoT manager
560 IoT device set up
561 IoT device set up mode ON/OFF
562 Add/Remove operational parameters
563 IoT device communication mode
563-M IoT mode drop-down menu.

What is claimed is:

1. An Internet of Things (IoT) platform, comprising:
a network;
a plurality of IoT servers coupled together and serviced by said network;
a plurality of IoT managers coupled to each other and to said plurality of IoT servers via said network; and
a plurality of IoT devices electrically coupled to said plurality of IoT managers, wherein at least one IoT server and at least one IoT manager, when coupled to said network, are operable to configure a plug-and-play and point-to-multipoint communication environment in which said plurality of IoT devices, said plurality of IoT servers, and said plurality of IoT managers communicate with one another in a plug-and-play and point-to-multipoint manner.

2. The IoT platform of claim 1 wherein said at least one IoT manager is configured to:
(a) detect whether said plurality of IoT devices, said plurality of IoT managers, and/or said plurality of IoT servers are each included in a control webapp;
(b) if said plurality of IoT devices, said plurality of IoT managers, and/or said plurality of IoT servers are each included in said control webapp, then control said plurality of IoT devices, said plurality of IoT managers, and/or said plurality of IoT servers in said plug-andplay and point-to-multipoint manner in accordance with setups and instructions of said control webapp; otherwise, (c) if any of said plurality of IoT devices, said plurality of IoT managers, and/or said plurality of IoT servers are not included in said control webapp, then detect operating parameters, physical connections, communication protocols, and industrial standards using a plug-and-play application program interface (API) and then insert said operating parameters, said communication protocols, and said industrial standards into said control webapp whereby said control webapp is configured to create said plug-and-play and point-to-multipoint communication environment.

3. The IoT platform of claim 2 wherein said at least one IoT manager further enables users to change and add said operating parameters of said plurality of IoT devices, said plurality of IoT managers, and said plurality of IoT servers using said control webapp.

4. The IoT platform of claim 3 wherein said at least one IoT manager further comprises a connections firmware configured to detect and connect said plurality of IoT devices, said plurality of IoT managers, and said plurality of IoT servers using said physical connections and said communication protocols; wherein said physical connections comprise a Zwave connection, a Zigbee connection, a Bluetooth connection, an Ethernet connection, a wifi connection, a cellular connection using a SIM, a LORA connection, and a near field communication (NFC) connection; and wherein said communication protocols comprise a HTTP protocol, a websocket protocol, and a MQTT protocol.

5. The IoT platform of claim 4 wherein said connections firmware detects said physical connections by:
using a detector to detect an operating frequency, said operating parameters, and said industrial standards of each of said plurality of IoT devices, said plurality of IoT managers, and said plurality of IoT servers; and wherein said connection firmware uses a driving circuit and a switching network to set up said physical connections among said plurality of IoT devices, said plurality of IoT managers, and said plurality of IoT servers by retrieving a device driver from a memory and loading said device driver into said driving circuit based on results obtained from said detector.

6. The IoT platform of claim 5 wherein said detector comprises a barcode scanner, a QR code scanner, an infrared scanner, and an RFID reader.

7. The IoT platform of claim 2 wherein said at least one IoT manager further comprises an IoT device controller operable to manage plug-and-play and point-to-multipoint communications for said plurality of IoT devices by creating virtual computing nodes between said plurality of IoT managers and said plurality of IoT devices when said plurality of IoT devices are first electrically coupled to and detected by said at least one IoT manager.

8. The IoT platform of claim 7 wherein said at least one IoT manager and said at least one IoT server are configured to form a virtual infrastructure for said plurality of IoT managers and said plurality of IoT devices, wherein said plurality of IoT managers and said plurality of IoT devices have said industrial standards, said physical connections, said communication protocols different from those of said at least one IoT manager and said at least one IoT server; wherein said virtual infrastructure comprises said virtual computing nodes; wherein said virtual infrastructure and said virtual computing nodes are embedded into said control webapp for managing said plurality of IoT devices, said plurality of IoT managers, and said plurality of servers in said plug-and-play manner and in said point to multipoint manner.

9. The IoT platform of claim 1 wherein said at least one IoT server further comprises a data repository which further comprises:
a universal real-time data storage for storing real-time data regarding present statuses of said plurality of IoT devices;
a universal past data storage for storage past data of said plurality of IoT devices.

10. The IoT platform of claim 9 wherein each of said at least one IoT server is configured to:
create a control webapp for said plurality of IoT devices, said plurality of IoT managers, and said plurality of IoT servers;
manage data send/receive to and from said plurality of IoT devices; and
receive said universal past and said real-time data from said data repository to perform data analytics that predicts operational behaviors of said plurality of IoT devices.

11. The IoT platform of claim 10 wherein said at least one IoT server further comprises a switching network configured to enable said at least one IoT manager and said plurality of IoT devices to communicate to one another in said point to multipoint manner according to a configuration in said control webapp.

12. A method of adaptively establishing a plug-and-play point to multiple point communication between a plurality of IoT devices, a plurality of IoT managers, and a plurality of IoT servers having different physical connections, industrial standards, and communication protocols, comprising:

(a) detect said physical connections for said plurality of IoT devices, a plurality of IoT managers, and a plurality of IoT servers;
(b) detect said communication protocols for said plurality of IoT devices, said plurality of IoT managers, and said plurality of IoT servers;
(c) establish a plug-and-play operation for said plurality of IoT devices, said plurality of IoT managers, and said plurality of IoT servers based on said detected physical connections, said industrial standards, and said detected communication protocols;
(d) determine whether said plurality of IoT devices, said plurality of IoT managers, and said plurality of IoT servers are incorporated in a control webapp, if said plurality of IoT devices, said plurality of IoT managers, and said plurality of IoT servers are included said control webapp, then
(e) use said control webapp to create a-plug-and-play and point-to-multipoint communication environment for said plurality of IoT devices, said plurality of IoT managers, and said plurality of IoT servers; wherein in said plug-and-play and point-to-multipoint communication environment, said plurality of IoT devices, said plurality of IoT managers, and said plurality of IoT servers communicate to one another in a plug-and-play and point-to-multipoint manner;
(f) if any of said plurality of IoT devices, said plurality of IoT managers, and said plurality of IoT servers are not included in said control webapp, detect operating parameters, said communication protocol, and said industrial standards;
(g) create configuration files for each of said plurality of IoT devices, each of said plurality of IoT managers, and each of said plurality of IoT servers based on said operating parameters, said communication protocols, and said industrial standards;
(h) embed said configuration files and load said operating parameters, said communication protocols, and said industrial standards into said control webapp, and use said control webapp to create said plug-and-play and point-to-multipoint communication environment for said plurality of IoT devices, said plurality of IoT managers, and said plurality of IoT servers.

13. The method of claim 12 wherein said step of using said control webapp to create said plug-and-play and point-to-multipoint communication environment further comprises:
(i) open said control webapp;
(j) log in and complete an authorization process;
(k) set up said control webapp for said plug-and-play and point-to-multipoint communication environment by switching corresponding on/off software buttons in a dropdown menu, each of said software buttons is associated with said plurality of IoT devices and said plurality of IoT managers;
(m) add and/or remove said operating parameters for each of said plurality of IoT devices; and
(n) update a configuration file that controls each of said plurality of IoT devices, each of said plurality of IoT managers, and each of said plurality of IoT servers.

14. The method of claim 13 wherein said step of using said control webapp to set up said plug-and-play and point-to-multipoint communication environment further comprises:
(o) set up operations for at least one IoT platform;
(p) set up operations for said IoT managers; and
(q) turn on a real time mode of each of said plurality of said IoT devices.

15. The method of claim 14 wherein said control webapp comprises:
(a) a login section configured to allow users to perform at least two-step authorization process;
(b) an IoT data observation section configured to receive and display data from said plurality of IoT devices;
(c) a point-to-multipoint (P2MP) set up section configured to enable users to set up plug-and-play and point-to-multipoint communication environment between said plurality of IoT devices; and
(d) an IoT server setup section configured to perform data analytics of said data from said plurality of IoT devices.

16. An IoT manager/server for managing an IoT platform all connected together and serviced by a network; said IoT platform comprising:
a pre-existing plurality of IoT devices, a plurality of IoT managers, and a plurality of IoT servers; said IoT manager/server comprising a memory and a processor, said memory storing non-transitory computer executable instructions, wherein said processor, when executing said computer executable instructions, cause said IoT manager to:
form and manage a control webapp;
manage and convert data and commands from said pre-existing plurality of IoT devices, said plurality of IoT managers, and said plurality of IoT servers;
perform data analysis and predict operation behaviors of said pre-existing plurality of IoT devices; and
manage a plug-and-play and point-to-multipoint communication environment for said pre-existing plurality of IoT devices by creating virtual computing nodes between said IoT manager/server and said pre-existing plurality of IoT devices when said pre-existing plurality of IoT devices are first electrically coupled to and detected by said IoT manager/server.

17. The IoT manager/server of claim 16 wherein said processor when executing said non-transitory computer executable instructions, cause said IoT manger/server to:
(a) detect whether said pre-existing plurality of IoT devices, said plurality of IoT managers, and/or said plurality of IoT servers are included in said control webapp;
(b) if said pre-existing plurality of IoT devices, said plurality of IoT managers, and/or said plurality of IoT servers are included in said control webapp, then control said pre-existing plurality of IoT devices, said plurality of IoT managers, and/or said plurality of IoT servers in a plug-and-play manner and a point to multipoint manner in accordance with setups and instructions of said control webapp; otherwise,
(c) if any of said pre-existing plurality of IoT devices, said plurality of IoT managers, and/or said plurality of IoT servers are not included in said control webapp, then for each of said pre-existing plurality of IoT devices, said plurality of IoT managers, and/or said plurality of IoT servers detect operating parameters, physical connections, communication protocols, and industrial standards using a plug-and-play application program interface (API) and then insert said operating parameters, said communication protocols, and said industrial standards into said control webapp, wherein said control webapp is configured to create said plug-and-play and point-to-multipoint communication environment.

18. The IoT manager/server of claim 17 further comprising: a connections firmware configured to detect and connect said pre-existing plurality of IoT devices, said plurality of IoT managers, said plurality of IoT servers using said physical connections; wherein said physical connections comprises a Zwave connection, a Zigbee connections, a Bluetooth connection, an Ethernet connection, a wifi connection, a cellular connection using a SIM, a LORA connection, and a near field communication (NFC) connection; wherein said communication protocols comprise a HTTP protocol, a web socket protocol, and a MQTT protocol.

19. The IoT manager/server of claim 18 wherein said connections firmware detects said physical connections by:
using a detector to detect an operating frequency, said operating parameters, and said industrial standards of each of said plurality of IoT devices, said plurality of IoT managers, and said plurality of IoT servers; and
wherein said connections firmware uses a driving circuit and a switching network to adaptively set up said physical connections among said pre-existing plurality of IoT devices, said plurality of IoT managers, and said plurality of IoT servers by retrieving a device driver from a memory and loading said device driver into said driving circuit based on results from said step of detecting said operating frequency, said operating parameters, and said industrial standards.

20. The IoT manager/server of claim 19 wherein said detector comprises a barcode scanner, a QR code scanner, an infrared scanner, and an RFID reader.

* * * * *